Nov. 17, 1964    E. N. WHEELER ETAL    3,157,693
RECOVERY OF ACRYLIC ACID ESTERS BY WATER
WASHING AND FRACTIONATION
Filed March 5, 1959    2 Sheets-Sheet 1
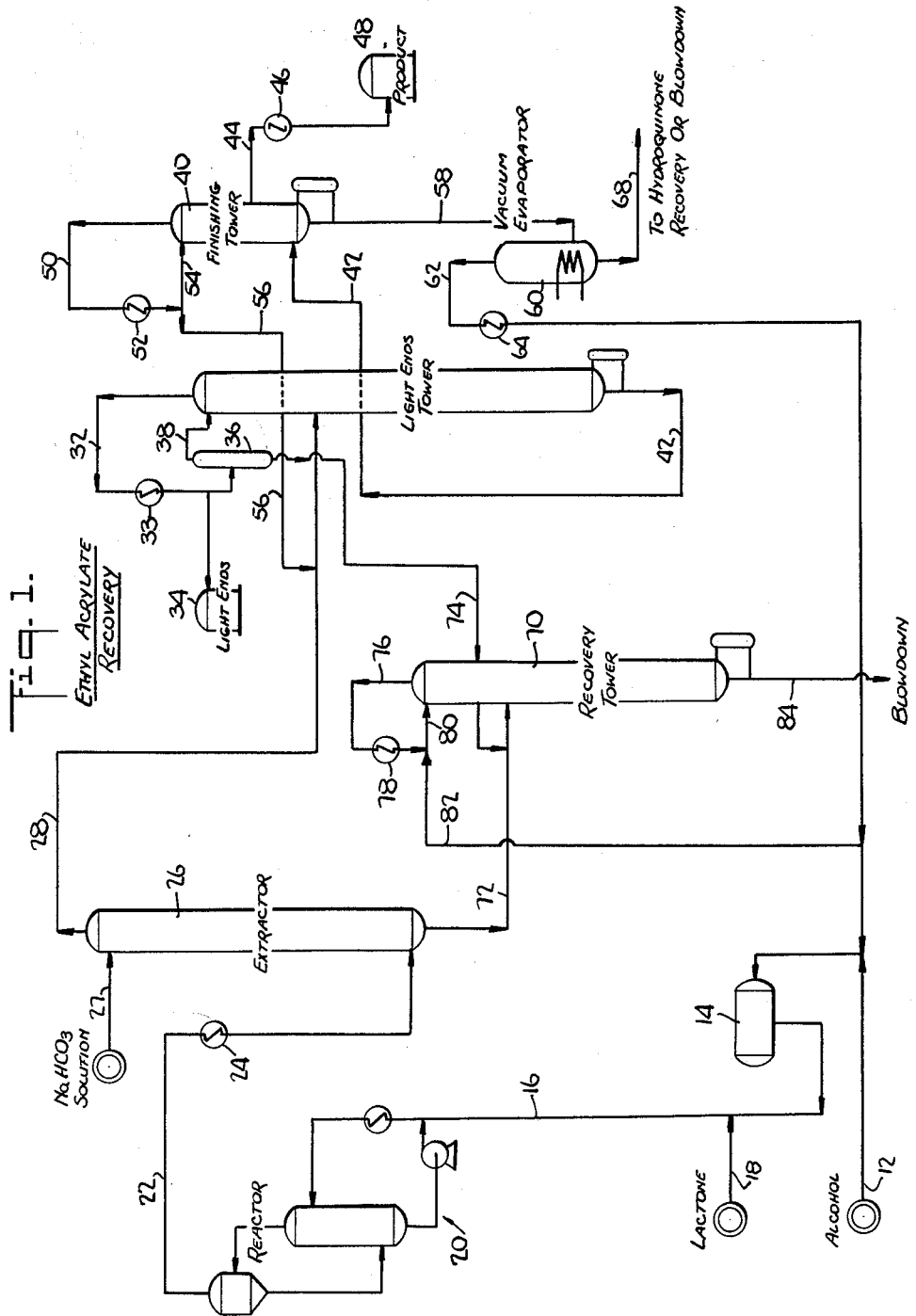

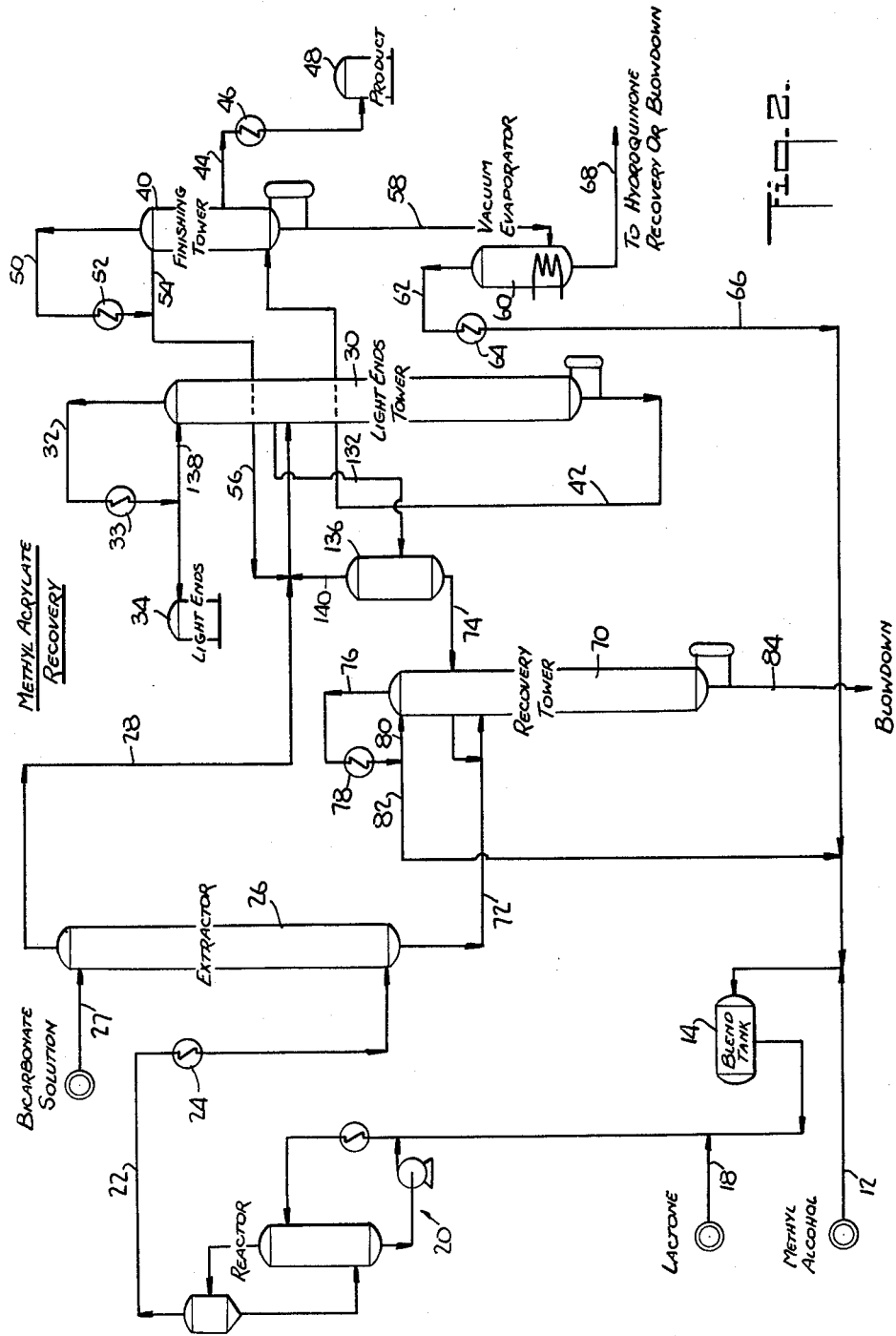

United States Patent Office 3,157,693
Patented Nov. 17, 1964

3,157,693
RECOVERY OF ACRYLIC ACID ESTERS BY WATER WASHING AND FRACTIONATION
Edward N. Wheeler, Gene J. Fisher, and Arthur W. Schnizer, Corpus Christi, Tex., assignors to Celanese Corporation of America, New York, N.Y., a corporation of Delaware
Filed Mar. 5, 1959, Ser. No. 797,410
15 Claims. (Cl. 260—486)

This invention relates to a process for purifying crude acrylic acid esters of lower alcohols, and in particular to the purification of methyl and ethyl acrylate.

A recently developed process for producing acrylic acid esters involves the reaction of beta-propiolactone (which may be in its monomeric or polymeric form, or as a mixture of monomer and polymer) and an alcohol. The reaction may be written as follows:

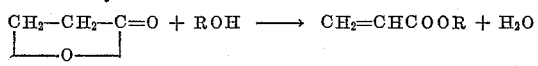

where R is a lower alcohol, for example methyl or ethyl.

However, when this reaction is employed to produce acrylates, a complex product mixture results. Aside from actual products of the above reaction, the product mixture, vaporized off continuously from the reaction zone, contains significant quantities of side reaction products and impurities of all sorts. Thus the reaction of beta-propiolactone and methanol results in a product mixture containing methanol, methyl acrylate, water, dimethyl ether, methyl methoxypropionate, and acrylic acid. Moreover, impurities ordinarily present in the beta-propiolactone and alcohol feed stocks carry over into the reaction product, resulting in the presence of significant quantities of compounds like methyl acetate and acetone. All told, the acrylate ester may constitute about 60 to 75 weight percent of the vaporized product mixture, and can be as little as one-half of the mixture. It is desirable to recover the acrylate ester in high yield and purity from this product mixture.

The object of the instant invention is to provide a process for purifying crude acrylic acid esters of lower alcohols.

A further object of the instant invention is to provide an extraction and rectification process for recovering pure acrylic acid esters of lower alcohols from an admixture with other normally liquid materials.

Further objects and the advantages of the instant invention will be apparent from the description which follows. In this description and claims all proportions are by weight unless otherwise indicated.

One aspect of the instant invention involves a multistep extraction-distillation procedure for recovering acrylic esters produced by the reaction of beta-propiolactone with alcohols. First the product stream from the acrylate synthesis reactor is water extracted or washed, preferably under alkaline pH conditions. Thereafter the water-immiscible constituents are fractionated to recover therefrom the acrylic ester in high purity. Interrelated with these extraction and distillation steps may be: a stripping operation for reclaiming extracted alcohols from the wash water; and further rectification procedures for reclaiming heavy and light ends fractions removed during the principal distillation step. As hereinafter pointed out the individual operations are integrated into the process as a whole.

As previously pointed out, the overhead product mixture resulting from the reaction of the alcohol with beta-propiolactone will contain at least about one-half by weight of the desired acrylate ester, the balance being largely unreacted alcohol, water, acrylic acid, and the corresponding ether ester of beta-hydroxypropionic acid. This mixture is then extracted with an aqueous medium to remove the alcohol and other water-soluble constituents therefrom, leaving behind a water-immiscible organic phase containing about 70% by weight or more (e.g. 70 to 85%) of acrylate ester and also containing on the order of about 3 to 4% of water. The removal of alcohol in this manner makes it possible to separate the acrylate ester from the other lower-boiling constituents by fractional distillation, as will be pointed out more fully in the discussion of the fractional distillation below. The extraction with water also serves to remove acrylic acid, a material which is corrosive to the distillation equipment, particularly in the presence of air. For more complete removal of the acrylic acid content it is preferable to use an aqueous extracting medium containing sodium bicarbonate, which converts the acrylic acid to the more water soluble sodium acrylate. At the same time the sodium bicarbonate causes less hydrolysis of the acrylate ester than more strongly alkaline solutions, such as sodium hydroxide or sodium carbonate solutions. Preferably the sodium bicarbonate contains not above about 9% NaHCO$_3$, e.g. 2 to 8% by weight. In this extraction the weight ratio of extractant water to crude acrylate mixture is suitably in the range of about 0.3:1 to 2:1. Advantageously the water is present in continuous phase in this extraction.

The partly purified acrylate ester is then further purified by fractional distillation. This distillation includes a removal of light ends overhead. An efficient removal of these light ends is made possible by the removal of the alcohol in the extraction step. For example, in the case of methyl acrylate, the presence of appreciable amounts of methanol causes the formation of a methanol-methyl acrylate azeotrope, resulting in a loss of substantial quantities of methyl acrylate in the light ends. When the methyl acrylate to be distilled contains methyl acetate and acetone and its methanol content exceeds 18% of the combined methyl acetate-acetone content, each weight percent of methanol above this amount causes almost an equal weight of methyl acrylate to distill into the light ends as an azeotrope. For instance, when the total methyl acetate-acetone content of the feed material to the light ends distillation is 5% and the methanol content is 3%, over 2% of the total methyl acrylate in the feed material appears in the light ends. The extraction procedure serves to reduce the methanol content to such a level that such loss of acrylate ester in the light ends is minimized.

As stated above, the partly purified acrylate ester generally contains about 3 to 4 weight percent water. We have found that, particularly in the case of methyl acrylate, this water cannot be removed, as overhead, from a distillation column with the light ends without azeotroping overhead large quantities of acrylate ester (the methyl acrylate-water azeotrope contains only 7% water). We have discovered that substantially water-free and light-ends-free methyl acrylate can be obtained very simply in a single column by withdrawing a liquid stream from a zone in the middle of the column where the methyl acrylate-water azeotrope was found to concentrate. By continuously decanting the water of this sidestream and returning the organic phase of the sidestream to the column (e.g. to the next lower tray), we have found that the water can be removed as fast as it is fed to the column. The substantially water-free acrylate ester obtained from the base of the column may be further purified in another distillation column from which the substantially pure material may be taken off as a vapor sidestream.

As discussed in the preceding paragraph, in the purification of water-containing methyl acrylate in accordance with this invention there is removed from a distillation column a sidestream of a mixture which exhibits phase separation, following which the organic phase is returned to the column. When the sidestream removed at one tray comprises all the liquid flowing down the column, the organic phase should be returned to the next lower tray of the column. Return of the organic phase to a lower point on the column, rather than to a higher point, has other advantages even when the sidestream does not contain all the downflowing liquid. Thus, when the sidestream represents a large part (e.g. 20–40%) of the downflowing liquid, the column shows some tendency to flood at the point where the sidestream is removed unless the organic phase is returned to a lower point. In addition, when the sidestream is taken off below the feed point of the column, the return of the organic phase at a lower point than the take off point gives a better match between the organic phase and the column composition. Another advantage of returning the organic phase to a lower point is that gravity flow may be used. However, if desired, the organic phase may be returned to a point above the take off point (as in Example II, below).

The preferred practice of the instant invention includes recycling of portions of the heavy ends and the organic components of the aqueous wash. Thus, the acrylate and alkoxypropionate contents of the heavy ends are recovered (as by distillation) for internal recycle in the synthesis and product separation sequence. Similarly, recovery of extracted organic components from the wash water for internal recycle is an important feature of operation according to preferred practice of the instant invention. The wash water removed from the extraction unit is fractionally distilled to strip therefrom the volatile organic compounds, principally alcohol. By appropriate control of the fractionation operation, it is possible to recover overhead a distillate containing up to about 10% by weight of water, the balance being largely the alcohol-ROH. Preferred practice is recovery of a distillate containing from about 5 to 10 percent by weight of water because at this water content in the distillate the minor amounts of acrylate ester, alkyl alkoxypropionate and other organic materials (such as acetone and acetates) carried over into the aqueous phase during the extraction are carried over into the distillate fraction along with the alcohol. The small water content does not interfere with the synthesis reaction and the entire distillate can therefore be recycled back to the acrylate synthesis unit. The stripped wash water, constituting the bottoms product of the still, contains all the sodium acrylate, and can be discarded.

For further understanding of the instant invention reference is now made to the attached drawing wherein:

FIGURE 1 diagrammatically illustrates an arrangement of apparatus for carrying out the preparation and recovery of ethyl acrylate; and FIGURE 2 diagrammatically illustrates an arrangement of apparatus for carrying out the preparation and recovery of methyl acrylate.

A preferred practice of operation according to the instant invention to prepare and recover methyl and ethyl acrylate will hereinafter be described with reference to the attached drawing.

Referring now to FIGURE 1 of the drawing, it can be seen that a feed stream of ethanol enters the system through a line 12 and together with recovered ethanol enters a storage vessel 14. Metered ethanol from storage vessel 14, and beta-propiolactone (in monomeric or polymeric form or as a mixture of monomers and polymers), from line 18 are drawn through reactor feed line 16. In reactor system 20 the combined feed stream is contacted with a phosphoric acid catalyst at a reaction temperature of, for example 145° C. in accordance with Kung U.S. Patent No. 2,376,704, for example. Catalyst and liquid constituents are recycled back to the feed stream as shown, while the vapor products are withdrawn from reactor system 20 through line 22 and condensed by passage through heat exchanger 24. The liquefied reaction products are passed directly to the bottom of extractor 26 for upward flow therethrough.

A dilute solution of sodium bicarbonate from line 27 enters the top of extractor 26 to flow down therethrough in a continuous phase, counter to discontinuous phase upflow of the water-immiscible reaction products. The water-immiscible constituents removed from extractor 26 by way of line 28 are fed directly to a light ends distillation tower 30. As its name indicates, light ends tower 30 is sized and operated to separate the more volatile constituents of the product stream. Water and the low boiling constituents or light ends which pass overhead of tower 30 through line 32 are condensed then collected in suitable storage vessel 34. The reflux stream of light ends recycled to the tower is first passed through a decanter 36 where stratification occurs in order to remove the water content. Only the oil or organic layer is passed from decanted 36 back through line 38 to the tower 30 as the tower reflux. If desired, all of the light ends overhead from line 32 may be dewatered in decanter 36 before being partitioned into the distillate and reflux streams.

The bottoms from light ends tower 30 are passed by way of line 42 for further fractionation in finishing tower 40. There, pure ethyl acrylate is removed as a vapor sidestream by way of line 44, liquefied in heat exchanger 46 and passed to suitable storage in vessel 48. The ethyl acrylate so recovered assays about 99% in purity. The overhead vapors from finishing tower 40 flow via line 50 to condenser 52; reflux for finishing tower 40 is returned through line 54 and the distillate fraction recycled through line 56 to light ends tower 30 for renewed fractionation. This recycle stream is directly admixed with the light ends tower feed stream in line 28, although if desired, a separate tower feed line may be employed.

If desired, the bottoms product of finishing tower 40 may be discarded. Preferably these heavy ends are passed by way of line 58 to a vacuum evaporator 60 to vaporize therefrom the ethyl acrylate and ethyl beta-ethoxypropionate content for recycle. Thus, vacuum evaporator 60 can be operated at an absolute pressure below about ½ atmosphere, e.g., a pressure of 200 millimeters of mercury absolute and at about 150° C., to vaporize these esters from the polymer product and any less volatile inhibitor. The overhead from vacuum evaporator 60 passes via line 62 to condenser 64 and is then recycled through line 66 for admixture with incoming ethanol. The liquid residue from vacuum evaporator 60 is removed through line 68 and may be discarded.

The alcohol recovery operation commences with the wash water from extractor 26 which passes through line 72 to alcohol recovery distillation tower 70. The water layer removed in decanter 36 from the light ends tower reflux is passed by way of line 74 to recovery tower 70. The two water streams are conjointly fed to recovery tower 70. (If desired, separate feeds may be used.) Recovery tower 70 is sized and operated to take overhead a fraction containing 5–10% by weight of water in order to vaporize also the small amounts of ethyl acrylate and ethyl beta-ethoxypropionate present in the wash water. The vapor taken overhead of recovery tower 70 through line 76, mostly ethanol, is liquefied in condenser 78 and divided into reflux and distillate. The reflux returns to the tower through line 80. The distillate, mostly alcohol, is passed through line 82 for admixture with the feed alcohol, while the aqueous bottoms fractions are taken off through line 84. The stripped wash water is almost entirely alcohol free.

In order to prevent polymerization of the acrylate ester inside the recovery apparatus, an inhibitor solution, such as hydroquinone, is added at key units, namely in extractor overflow line 28, at reactor condenser 24, and at all tower overhead and side stream condensers.

In FIGURE 2, relating to recovery of methyl acrylate, the same legends are employed as on FIGURE 1 for corresponding apparatus. Thus, the drawing shows reactor arrangement 20, extractor 26, light ends tower 30, finishing tower 40, vacuum evaporator 60, recovery tower 70 and appurtenant connections. However, decanter 36 is omitted; reflux to light ends tower 30 flows back through line 138 directly from condenser 33, and the water is removed by withdrawing liquid side stream at a midpoint tray of tower 30. The side stream is withdrawn through line 132 and collected in a decanter 136 for stratification into water and oil layers. The water layer is taken off through line 74 for passage to recovery tower 70 while the organic layer is returned to the tower, as from line 140 to the light ends tower feed line 28 or, if desired, form a separate feed to the tower. The decanted organic layer is preferably returned to the tray below the liquid sidestream takeoff, particularly when a total sidestream is taken off.

As may be noted from both figures of the drawing, the synthesis and recovery process is thoroughly integrated for maximum yield of high purity acrylate. Thus, the distillate from light ends tower 30, the residue from vacuum evaporator 60, and the blowdown from recovery tower 70 have negligible amounts of alcohol and acrylate ester. Recycle of both the acrylate ester recovered from vacuum evaporator 60 and the alcohol distilled from recovery tower 70 back to reactor 20 causes the high recovery rate. In turn existence of this efficient recycle arrangement allows operation of towers 30 and 40 for highest possible acrylate purity. Actually the performance of this acrylate recovery process permits utilization of impure alcohol and impure beta-propiolactone for the acrylate synthesis reaction.

For a detailed understanding of the practice of this invention, the following operational examples are presented.

Example I

An apparatus arranged as in FIGURE 1 was used to synthesize and recover pure ethyl acrylate. The reactor products (taken overhead and containing 57.1% ethyl acrylate, 9.7% water and 13.5% ethanol, 5.7% acetone, 5.8% ethyl acetate, 5.3% ether, 1.3% ethyl beta-ethoxypropionate and 1.1% acrylic acid) were fed to extractor 26 which was a tower (14 feet high, ½ foot in diameter and packed with ½ inch Berl saddles) to which a 7% aqueous sodium bicarbonate solution was fed countercurrent.

The weight ratio of aqueous phase to organic phase fed to the extractor was 1:2 and the extractor was operated at ambient temperature (21 to 32° C.). The pH of the extractor residue was 10.2. The extractor overhead contained 73.3% ethyl acrylate and no detectable acrylic acid.

The extractor residue was fed to tray 15 of recovery tower 70, which was a 24-tray tower operated at atmospheric pressure overhead, with the overhead temperatures controlled at 76° C.±3° C. by adjustment of the reflux ratio to maintain the distillate water content in the 7–10% range; the base temperature of this tower was 104° C. The residue from this tower was almost entirely water, while the distillate contained 20.8% of ethyl acrylate and 53% ethanol and was recycled to the reactor.

The extractor overhead was fed to the light ends tower, which was a 30-tray tower operated at atmospheric pressure overhead and fed on tray 22; its top temperature was 70 to 73° C.

The overhead from the light ends tower was principally ethyl acetate, while the residue from the light ends tower contained 97.2% ethyl acrylate.

The residue from the light ends tower was fed to the base of the 15-tray finishing tower 40 operated at 2 p.s.i.g. overhead, the acrylate product side stream containing 99.2% ethyl acrylate being taken from tray 8. The residue from the finishing tower was passed to the vacuum evaporator 60 which was operated under 200 mm. Hg absolute pressure with its liquid temperature maintained at 148° C., to prevent hydroquinone (present as an inhibitor) from solidifying.

Example II

Using the same equipment as in the previous example but with the light ends tower rearranged to make the apparatus as a whole conform to FIGURE 2, beta-propiolactone and methanol were reacted at temperatures of about 140° C. Product methyl acrylate assaying 98.6% in purity was recovered at an efficiency of 87% based on the propiolactone and 69% based on MeOH.

The weight ratio of aqueous phase to organic phase fed to the extractor was 1:2, the temperature of the extractor was ambient temperature (21 to 32° C.) and the pH of the residue from the extractor was 7–8.

The recovery tower was operated at atmospheric pressure overhead and at a top temperature of 70° C. and a base temperature of 102° C. The light ends tower was operated at 2 p.s.i.g. overhead with a top temperature of 66° C. and a base temperature of 86° C. The finishing tower was operated under 2 p.s.i.g. overhead, with a top temperature of 80° C. and a base temperature of 99–107° C., while the evaporator was operated at 180 mm. Hg absolute with a liquid phase temperature of 148° C. The sidestream of the light ends tower was taken from tray 16 and returned to tray 22 after decantation.

The reactor overhead contained 49.8% methyl acrylate, 19.2% water, 9.8% methanol, 6.4% methyl acetate, 6.3% dimethyl ether, 6.0% acetone, 1.9% methyl betamethoxypropionate and 0.2% acrylic acid. The extractor overhead contained 76.4% methyl acrylate and no detectable acrylic acid. The recovery tower overhead contained 32.3% methanol and 36.7% methyl acrylate, the light ends tower residue was 96.3% methyl acrylate and the finishing tower product was 98.6% methyl acrylate.

The proportions given in the above examples are average analyses for the various streams during continuous runs. In all the above examples, polymerization of acrylic compounds in the distillation equipment was prevented by addition of hydroquinone, as is well known, to the various streams and by injecting air into each of the columns. The air was injected at a rate of about 1 to 10 mole percent of the column boil-up rate.

While the invention is illustrated specifically with methyl and ethyl acrylates, it may also be applied to other acrylates of water-soluble lower alcohols, such as propyl, isopropyl and allyl alcohols.

It is to be understood that the foregoing detailed description is given merely by way of illustration and that many variations may be made therein without departing from the spirit of our invention.

Having described our invention, what we desire to secure by Letter Patent is:

1. A process for recovering an acrylic acid ester of a 1–3 carbon alcohol in high purity which comprises; washing the crude acrylate ester which contains unreacted alcohol and acrylic acid as impurities with a dilute water solution of sodium bicarbonate, thereafter fractionating the washed acrylate ester to separate the acrylate ester in high puriy from both more volatile and less volatile components present in the washed ester.

2. The process of claim 1 wherein the wash water is distilled to recover therefrom components extracted by said washing.

3. The method of recovering in high purity, acrylic acid esters synthesized by reaction of beta-propiolactone with a 1–3 carbon alcohol which comprises the steps of: washing the reaction product with a dilute water solution of sodium bicarbonate to extract the alcohol and acrylic acid present as impurities in said product, then fractionating the washed reaction product to separate the acrylate ester in high purity from both more volatile and less volatile components present in the washed ester.

4. The process of claim 3 wherein the wash water is distilled to recover therefrom the alcohol for recycle back to the acrylate synthesis.

5. The process of claim 4 wherein the wash water distillation is effected to provide an alcohol overhead containing from about 5–10% by weight thereof of water, whereby minor quantities of acrylate ester taken up by the water wash are also recovered in the distillate.

6. The process of claim 3 wherein the less volatile components removed from the acrylate ester are themselves distilled under vacuum to recover therefrom their impure acrylate ester content for recycle back to the acrylate synthesis.

7. The process of claim 3 wherein the removal of more volatile components from the acrylate ester by fractionation involves stratification of light ends into a water layer and an organic layer, at least part of the organic layer being returned to the fractionation, the water layer being removed.

8. The process of claim 7 wherein both the removed water layer and the wash water are distilled to recover therefrom the alcohol content for recycle back to the acrylate synthesis.

9. The method of recovering in high purity acrylic acid esters synthesized by reaction of beta-propiolactone with a 1–3 carbon alcohol which comprises the steps of: water washing the reaction product to extract the alcohol and acrylic acid; then fractionating the washed water-immiscible reaction product to separate out the acrylate ester in high purity from both more volatile and less volatile components; removing the more volatile components as light ends of the fractionation; removing the less volatile components as heavy ends of the fractionation; and distilling the wash water to recover therefrom the extracted components, principally alcohol, for recycle back to the acrylate synthesis.

10. The process of claim 9 wherein the removal of more volatile components from the acrylate ester by fractionation involves stratification of light ends into a water layer and an organic layer, at least part of the organic layer being returned to the fractionation, the water layer being removed to the wash water distillation.

11. The process of claim 9 wherein the heavy ends are vacuum distilled to recover therefrom their impure acrylate ester content and wherein the impure acrylate ester is added to the alcohol for recycle back to the acrylate synthesis.

12. In a distillation process for recovering methyl acrylate from a homogeneous feed mixture of methyl acrylate, water and light ends of lower boiling point than said methyl acrylate, the improvement which comprises continuously feeding said mixture to a fractional distillation column, distilling off light ends from an upper zone of said column, recovering from a lower zone of said column a residue enriched in methyl acrylate, while maintaining, at an intermediate zone of said column, a methyl acrylate-water mixture which exhibits phase separation, withdrawing, as a side stream, a portion of said mixture from said intermediate zone, causing said stream to form a liquid water layer and a liquid water-immiscible methyl acrylate layer and returning said methyl acrylate layer to said column.

13. Process as set forth in claim 12 in which said feed mixture contains about 3–4% water.

14. Process as set forth in claim 12 in which said feed mixture is substantially saturated with water and the side stream is withdrawn, as a liquid, from a point on said column higher than the point at which said methyl acrylate layer is returned.

15. Process as set forth in claim 9, in which air is injected into the material being fractionated to inhibit polymerization during fractionation.

References Cited in the file of this patent
UNITED STATES PATENTS

| | | |
|---|---|---|
| 2,171,795 | Kautter | Sept. 5, 1939 |
| 2,314,443 | Crawford et al. | Mar. 23, 1943 |
| 2,618,590 | Unger et al. | Nov. 18, 1952 |
| 2,741,583 | Vaughan et al. | Apr. 10, 1956 |
| 2,803,588 | Gerstner et al. | Aug. 20, 1957 |
| 2,872,478 | Wechsler et al. | Feb. 3, 1959 |
| 2,891,991 | Stewart et al. | June 23, 1959 |